US012749785B2

(12) United States Patent
Tani et al.

(10) Patent No.: US 12,749,785 B2
(45) Date of Patent: Sep. 29, 2026

(54) WAVEGUIDE DEVICE OPERABLE UP TO TERAHERTZ FREQUENCIES INCLUDING A LINE SUBSTRATE HAVING PERIODIC HOLES FORMED THEREIN AND WHICH IS MOUNTED ON A SUPPORT SUBSTRATE

(71) Applicant: NGK INSULATORS, LTD., Nagoya-City (JP)

(72) Inventors: Kentaro Tani, Nagoya (JP); Jungo Kondo, Nagoya (JP)

(73) Assignee: NGK INSULATORS, LTD., Nagoya-City (JP)

( * ) Notice: Subject to any disclaimer, the term of this patent is extended or adjusted under 35 U.S.C. 154(b) by 178 days.

(21) Appl. No.: 18/408,774

(22) Filed: Jan. 10, 2024

(65) Prior Publication Data

US 2024/0186672 A1 Jun. 6, 2024

Related U.S. Application Data

(63) Continuation of application No. PCT/JP2022/030401, filed on Aug. 9, 2022.

(30) Foreign Application Priority Data

Aug. 10, 2021 (JP) ................................ 2021-130688

(51) Int. Cl.
*H01P 1/20* (2006.01)
*H01P 3/00* (2006.01)
(Continued)

(52) U.S. Cl.
CPC ............ *H01P 1/2005* (2013.01); *H01P 3/003* (2013.01); *H01P 3/121* (2013.01); *H01P 3/165* (2013.01)

(58) Field of Classification Search
CPC ......... H01P 1/2005; H01P 3/121; H01P 3/165
(Continued)

(56) References Cited

U.S. PATENT DOCUMENTS 5,526,449 A * 6/1996 Meade et al. ............ G02B 6/00 385/32
8,002,998 B2 8/2011 Iwata et al.
(Continued)

FOREIGN PATENT DOCUMENTS

JP 2008-052108 A 3/2008
JP 2015-162787 A 9/2015
JP 2019-033464 A 2/2019

OTHER PUBLICATIONS

English translation of the International Preliminary Report on Patentability (Chapter I) dated Feb. 22, 2024 (Application No. PCT/JP2022/030401).
(Continued)

*Primary Examiner* — Benny T Lee
(74) *Attorney, Agent, or Firm* — Muncy, Geissler, Olds & Lowe, P.C.

(57) ABSTRACT

A waveguide device includes: a line substrate having holes periodically formed in a semiconductor substrate; a waveguide configured to propagate an electromagnetic wave while confining the electromagnetic wave therein with the holes; a low-dielectric constant portion having a dielectric constant smaller than a dielectric constant of the line substrate, the low-dielectric constant portion overlapping the waveguide in a thickness direction of the line substrate; and a support substrate arranged below the line substrate, the support substrate being configured to support the line substrate. The waveguide device is configured to guide an electromagnetic wave having a frequency of 30 GHz or more and 20 THz or less.

12 Claims, 10 Drawing Sheets

(51) Int. Cl.
*H01P 3/12* (2006.01)
*H01P 3/16* (2006.01)

(58) Field of Classification Search
USPC .......................................................... 333/248
See application file for complete search history.

(56) References Cited

U.S. PATENT DOCUMENTS

| | | | | |
|---|---|---|---|---|
| 8,454,845 | B2 * | 6/2013 | Dutta | H01L 23/66<br>216/17 |
| 2002/0159126 | A1 * | 10/2002 | Sigalas et al. | B82Y 20/00<br>359/321 |
| 2005/0237137 | A1 * | 10/2005 | Dutta | H01P 3/085<br>333/246 |
| 2006/0083472 | A1 | 4/2006 | Sakai et al. | |
| 2006/0269188 | A1 * | 11/2006 | Noda et al. | B82Y 20/00<br>385/39 |
| 2008/0047928 | A1 | 2/2008 | Iwata et al. | |
| 2015/0241630 | A1 | 8/2015 | Fujita et al. | |

OTHER PUBLICATIONS

Eiichi Kuramochi, "Improving Performance of Photonic Crystal Waveguides/Resonators," NTT Technical Review, Feb. 2006, vol. 18, No. 2, pp. 13-17 (5 pages).

International Search Report and Written Opinion (Application No. PCT/JP2022/030401) dated Oct. 25, 2022 (9 pages).

Gao, Weijie, et al., "*Effective-Medium-Cladded Dielectric Wave-guides for Terahertz Waves*," Optics Express, 2019, 27. vol. 27 No. 26, pp. 38721-38734.

Kuramochi, Eiichi, et al., "*Si-based Photonic Crystal Components Relationship between Performance and Structural Disorder*," NTT Technical Review, vol. 3, No. 12, p. 1, 2005.

Kuramochi, Eiichi, et al., "*Silicon-Based Large-Scale Photonic Crystal Nanocavity Arrays for Slow-Light Applications*," NTT Technical Review, vol. 8, No. 2, p. 69, 2010.

German Office Action (with English translation) dated Nov. 24, 2025 (Application No. 11 2022 002 796.7).

* cited by examiner

WAVEGUIDE DEVICE OPERABLE UP TO TERAHERTZ FREQUENCIES INCLUDING A LINE SUBSTRATE HAVING PERIODIC HOLES FORMED THEREIN AND WHICH IS MOUNTED ON A SUPPORT SUBSTRATE

CROSS-REFERENCE TO RELATED APPLICATIONS

This application is a continuation under 35 U.S.C. 120 of International Application PCT/JP2022/030401 having the International Filing Date of 9 Aug. 2022 and having the benefit of the earlier filing dates of Japanese Application No. 2021-130688, filed on 10 Aug. 2021. Each of the identified applications is fully incorporated herein by reference.

BACKGROUND OF THE INVENTION

1. Field of the Invention

The present invention relates to a waveguide device.

2. Description of the Related Art

There have been advances in the development of a waveguide device serving as one electro-optical device. The applications and development of the waveguide device in a wide variety of fields including an optical waveguide, next-generation high-speed communication, a sensor, laser processing, and photovoltaic power generation have been expected. For example, there have been advances in the development of a waveguide device as a waveguide for waves ranging from a millimeter wave to a terahertz wave, the waveguide serving as a key to the next-generation high-speed communication. A technology including using a photonic crystal formed of a semiconductor material has been proposed as an example of such waveguide device (Patent Literature 1).

When a photonic crystal based on such technology is adopted in various industrial products, consideration has been given to the mounting of the photonic crystal on a support substrate, such as an IC substrate or a printed circuit board. However, the mounting of the photonic crystal on the support substrate involves a problem in that a propagation loss remarkably increases.

CITATION LIST

Patent Literature

[PTL 1] JP 2019-33464 A published Feb. 28, 2019.

SUMMARY OF THE INVENTION

A primary object of the present invention is to provide a waveguide device that can secure excellent low-propagation loss performance in an aspect in which a line substrate is mounted on (i.e., supported by) a support substrate.

[1] According to an embodiment of the present invention, there is provided a waveguide device, including: a line substrate having holes periodically formed in a semiconductor substrate; a waveguide configured to propagate an electromagnetic wave while confining the electromagnetic wave therein with the holes; a low-dielectric constant portion having a dielectric constant smaller than a dielectric constant of the line substrate, the low-dielectric constant portion overlapping the waveguide in a thickness direction of the line substrate; and a support substrate arranged below the line substrate, the support substrate being configured to support the line substrate. The waveguide device is configured to guide an electromagnetic wave having a frequency of 30 GHz or more and 20 THz or less.

[2] In the waveguide device according to the above-mentioned embodiment [1], a dimension of the low-dielectric constant portion in the thickness direction of the line substrate may satisfy the following formula (1):

$$T \geq \sqrt{\varepsilon} \times D/10 \qquad (1)$$

where T represents the dimension of the low-dielectric constant portion in the thickness direction of the line substrate, ε represents a dielectric constant of the line substrate at 300 GHz, and D represents a thickness of the line substrate.

[3] In the waveguide device according to the above-mentioned embodiments [1] or [2], a dimension of the low-dielectric constant portion in the thickness direction of the line substrate may be 1/10 or more and 1/5 or less of a wavelength λ of the electromagnetic wave to be guided by the waveguide.

[4] In the waveguide device according to any one of the above-mentioned embodiments [1] to [3], the waveguide device may further include an active device capable of at least one of transmission, reception, or amplification of the electromagnetic wave, the active device being supported by the support substrate.

[5] In the waveguide device according to any one of the above-mentioned embodiments [1] to [4], the semiconductor substrate may include silicon, and the support substrate may include at least one kind selected from the group consisting of: indium phosphide; silicon; aluminum nitride; silicon carbide; and silicon nitride.

[6] In the waveguide device according to any one of the above-mentioned embodiments [1] to [5], the low-dielectric constant portion may be a cavity.

[7] In the waveguide device according to any one of the above-mentioned embodiments [1] to [6], the line substrate may be directly joined to the support substrate.

[8] In the waveguide device according to any one of the above-mentioned embodiments [1] to [7], the support substrate may have a depressed portion, and the cavity may be defined by a lower surface of the line substrate and the depressed portion of the support substrate.

[9] In the waveguide device according to any one of the above-mentioned embodiments [1] to [8], the waveguide device may further include an insulating layer positioned between the line substrate and the support substrate, and the cavity may be defined by a lower surface of the line substrate, an upper surface of the support substrate, and the insulating layer.

[10] In the waveguide device according to any one of the above-mentioned embodiments [1] to [9], the line substrate may include a photonic crystal or an effective dielectric medium.

[11] In the waveguide device according to any one of the above-mentioned embodiments [1] to [10], the line substrate may have formed therein a resonator and/or an antenna including a photonic crystal.

[12] In the waveguide device according to any one of the above-mentioned embodiments [1] to [11], the low-dielectric constant portion may overlap all the holes in addition to the waveguide in the thickness direction of the line substrate.

According to the embodiment of the present invention, there can be achieved the waveguide device that can secure excellent low-propagation loss performance in the aspect in which the line substrate is mounted on (i.e., supported by) the support substrate.

BRIEF DESCRIPTION OF THE DRAWINGS

FIG. 9A is an illustration of a first unit cell, and FIG. 9B is an illustration of a second unit cell.

DETAILED DESCRIPTION OF THE EMBODIMENTS

Embodiments of the present invention are described below, where like features are denoted by the same reference labels throughout the detailed description of the drawings. However, the present invention is not limited to these embodiments.

A. Overall Configuration of Waveguide Device

A-1. Overall Configuration of Waveguide Device 100

Figure 1:
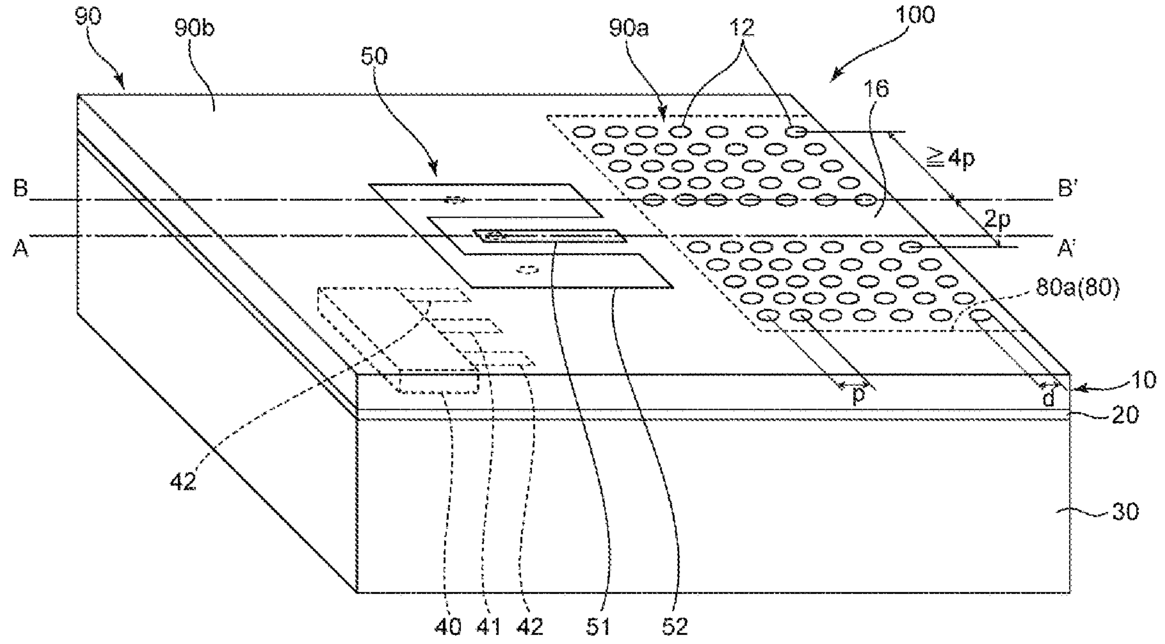
FIG. 1 is a schematic perspective view of a waveguide device according to an embodiment of the present invention.
Figure 2:
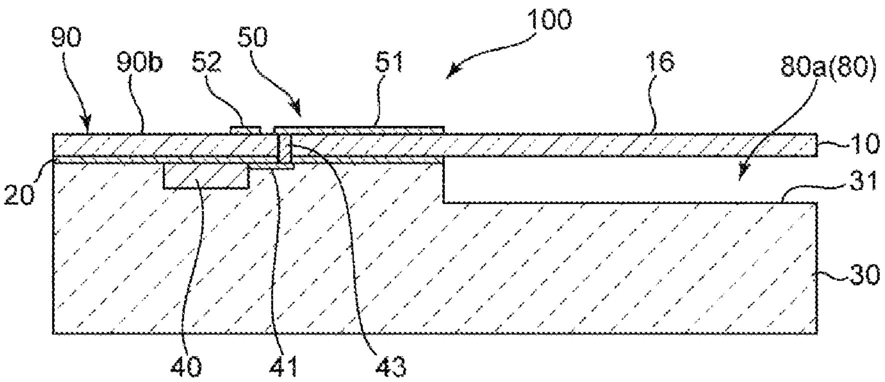
FIG. 2 is a sectional view of the waveguide device taken along the line AA' of FIG. 1.
Figure 3:
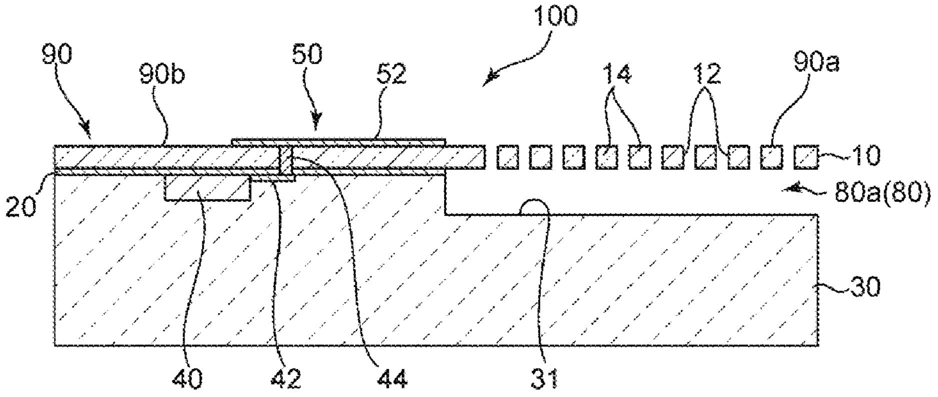
FIG. 3 is a sectional view of the waveguide device taken along the line BB' of FIG. 1.

FIG. 1 is a schematic perspective view of a waveguide device according to one embodiment of the present invention, FIG. 2 is a sectional view of the waveguide device taken along the line AA' of FIG. 1, and FIG. 3 is a sectional view of the waveguide device taken along the line BB' of FIG. 1.

A waveguide device 100 of the illustrated example includes: a line substrate 90 having holes 12 periodically formed in a semiconductor substrate 10; a waveguide 16 configured to propagate an electromagnetic wave while confining the electromagnetic wave therein with the holes 12; a low-dielectric constant portion 80 having a dielectric constant smaller than a dielectric constant of the line substrate 90, the low-dielectric constant portion 80 overlapping the waveguide 16 in a thickness direction of the line substrate 90; and a support substrate 30 arranged below the line substrate 90, the support substrate 30 being configured to support the line substrate 90. The waveguide device 100 is configured to guide an electromagnetic wave having a frequency of 30 GHz or more and 20 THz or less.

The waveguide 16 of the waveguide device 100 of the illustrated example propagates electromagnetic waves ranging from a millimeter wave to a terahertz wave while confining the electromagnetic waves therein with the holes 12. The term "millimeter wave" typically refers to an electromagnetic wave having a frequency of from about 30 GHz to about 300 GHZ, and the term "terahertz wave" typically refers to an electromagnetic wave having a frequency of from about 300 GHz to about 20 THz. The waveguide 16 is typically a line-defect waveguide defined as a portion in the semiconductor substrate 10 where the holes 12 are not formed.

According to the above-mentioned configuration, in an aspect in which the line substrate is mounted on (supported by) the support substrate, the low-dielectric constant portion overlaps the waveguide in the thickness direction of the line substrate. Accordingly, when an electromagnetic wave having a frequency of 30 GHz or more and 20 THz or less is propagated, the leakage of the electromagnetic wave to the support substrate can be suppressed. Thus, even in the aspect in which the line substrate is mounted on (supported by) the support substrate, the electromagnetic wave can be propagated while being stably confined in the waveguide formed in the line substrate, and hence an increase in propagation loss can be suppressed.

Figure 11:
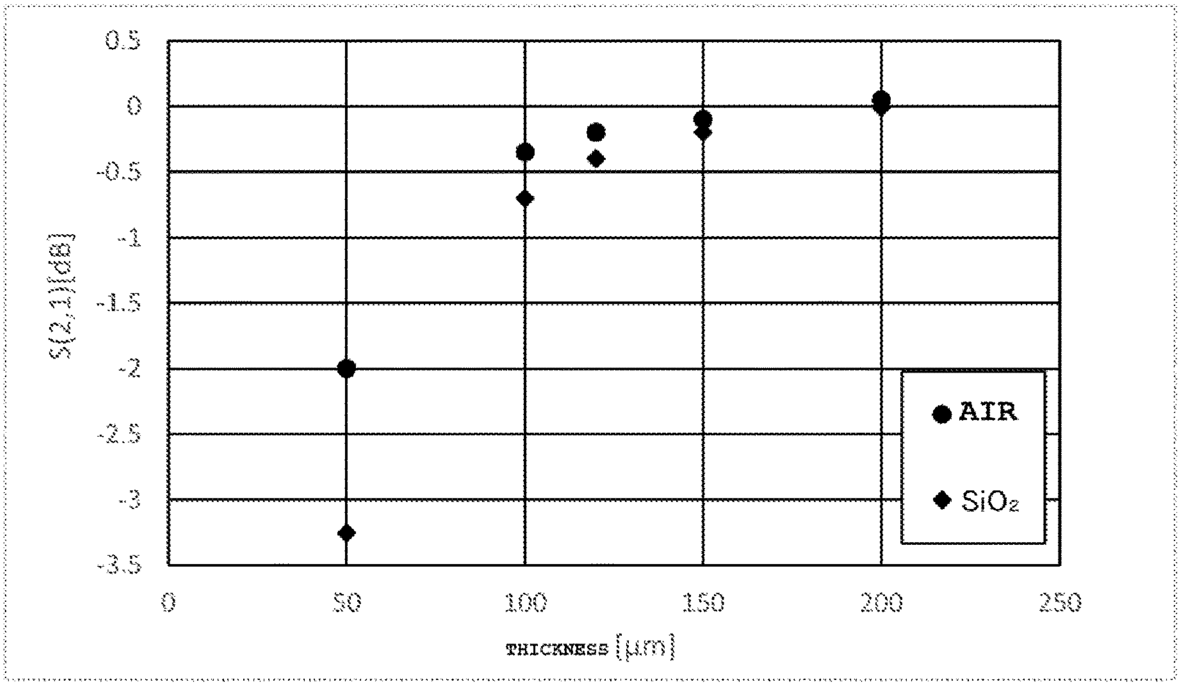
FIG. 11 is a graph for showing a relationship between the thickness of a low-dielectric constant portion and a propagation loss.

In the waveguide device 100 of the illustrated example, the low-dielectric constant portion 80 is a cavity 80*a*. The low-dielectric constant portion preferably has a dielectric constant of 4 or less, and may be, for example, a $SiO_2$ layer or a quartz glass plate. As shown in FIG. 11, in the case where the low-dielectric constant portion is a cavity (i.e., air), the leakage of the electromagnetic wave propagating in the waveguide from the waveguide can be more stably suppressed as compared to the case where the low-dielectric constant portion is a $SiO_2$ layer or a quartz glass plate. FIG. 11 shows the results of an electromagnetic field simulation of a relationship between the thickness (μm) of the low-dielectric constant portion and propagation loss (dB) calculated by a finite element method under the following conditions.

Simulation Conditions;

Hole period: 160 μm, hole radius: 72 μm, line substrate thickness: 260 μm, line width (waveguide width): 360 μm, line substrate material: silicon, preset frequency: 300 GHz, line length (waveguide length): 10 mm In the waveguide device 100 of the illustrated example, the line substrate 90 is directly joined to the support substrate 30. As used herein, the term "direct joining" means that two layers or substrates are joined to each other without an adhesive (typically an organic adhesive) being interposed therebetween. The form of the direct joining may be appropriately set in accordance with the configurations of the layers or substrates to be joined to each other. Further, an interface joined by the direct joining is typically amorphized. Accordingly, the thermal resistance of the joining interface can be dramatically reduced as compared to resin joining. Thus, in the case where an active device, such as an oscillator or a receiver, is mounted on the waveguide device, even when heat generated from the active device is transferred to the line substrate, such heat can be smoothly allowed to escape from the line substrate to a package via the support substrate. As a result, heating of the line substrate can be suppressed, and hence degradations in characteristics of the other active device or mounted part can be suppressed. A method for the "direct joining" is described in detail later.

When those components are integrated by the direct joining, peeling in the waveguide device can be satisfactorily suppressed, and as a result, damage (e.g., a crack) to the line substrate resulting from such peeling can be satisfactorily suppressed.

The form of the direct joining may also include joining of the support substrate and the line substrate to each other via a joining portion. The waveguide device 100 of the illustrated example further includes a joining portion 20 arranged between the line substrate 90 and the support substrate 30 to join the line substrate 90 and the support substrate 30 to each other. In each of FIG. 1 to FIG. 3, only the joining portion 20 is arranged between the line substrate 90 and the support substrate 30. It is preferred that the joining portion be free of a resin material, such as an organic material-based adhesive or a resin material substrate, interposed between the line substrate 90 and the support substrate 30 (i.e., include an inorganic material). Thus, thermal resistance at an interface between the line substrate and the support substrate can be reduced. The line substrate and the support substrate may be directly joined to each other without the arrangement of any joining portion.

In one embodiment, the support substrate 30 has a depressed portion 31. The depressed portion 31 is depressed downward from the upper surface of the support substrate 30. The depressed portion 31 is typically opened toward one side in the waveguide direction of the waveguide 16. The cavity 80*a* is defined by the lower surface of the line substrate 90 and the depressed portion 31 of the support substrate 30.

In one embodiment, the dimension of the low-dielectric constant portion 80 (cavity 80*a*) in the thickness direction of the line substrate 90 satisfies the following formula (1), and more preferably satisfies the following formula (2):

$$T \geq \sqrt{\varepsilon} \times D/10 \quad (1)$$

$$T \geq \sqrt{\varepsilon} \times D/10 + 50 \quad (2)$$

where T represents the dimension of the low-dielectric constant portion in the thickness direction of the line substrate, ε represents the dielectric constant of the line substrate at 300 GHz, and D represents the thickness of the line substrate.

When the dimension of the low-dielectric constant portion in the thickness direction of the line substrate satisfies the above-mentioned formulae, the electromagnetic wave can be propagated while being more stably confined in the waveguide, and hence a reduction in propagation loss can be achieved.

The dielectric constant & of the line substrate 90 at 300 GHz is typically 11.5 or more, preferably 11.6 or more, and is typically 13 or less, preferably 12.5 or less.

The thickness D of the line substrate 90 is typically 50 μm or more, preferably 100 μm or more, more preferably 200 μm or more, and is typically 600 μm or less, preferably 500 μm or less.

In one embodiment, the dimension of the low-dielectric constant portion 80 (cavity 80*a*) in the thickness direction of the line substrate 90 is 1/10 or more of the wavelength λ of the electromagnetic wave to be guided by the waveguide 16, preferably 1/8 or more of the wavelength λ of the electromagnetic wave, and is 1/5 or less of the wavelength λ of the electromagnetic wave.

When the dimension of the low-dielectric constant portion in the thickness direction of the line substrate falls within the above-mentioned ranges, the electromagnetic wave can be even more stably confined in the waveguide, and hence a further reduction in propagation loss can be achieved.

The dimension of the low-dielectric constant portion 80 (cavity 80*a*) in the thickness direction of the line substrate 90 is specifically 20 μm or more, preferably 50 μm or more, more preferably 80 μm or more, still more preferably 120 μm or more, and is, for example, 500 μm or less, preferably 200 μm or less.

The waveguide device 100 of the illustrated example includes an active device 40 capable of at least one of the transmission, reception, or amplification of an electromagnetic wave having a frequency of 30 GHz or more and 20 THz or less, the active device 40 being supported by the support substrate 30.

According to such configuration, the active device and the line substrate are integrated with each other to enable a wafer process, and hence characteristic variations can be reduced. Thus, an improvement in productivity of the waveguide device can be achieved. Accordingly, an inexpensive waveguide device can be achieved.

The active device 40 is supported by the support substrate 30, and is typically buried in the portion except the depressed portion 31 on the upper surface of the support substrate 30. Examples of the active device 40 include a resonance tunnel diode, a Schottky barrier diode, a CMOS transceiver, and an InP HEMT.

In the illustrated example, the active device 40 is a resonance tunnel diode. The active device 40 can at least transmit (can generate and radiate) the electromagnetic wave. Further, the active device 40 may be able to receive and/or amplify the electromagnetic wave. The active device 40 includes a first device electrode 41 and two second device electrodes 42. The first device electrode 41 and the two second device electrodes 42 each extend in the waveguide direction of the waveguide 16. The two second device electrodes 42 are arranged to be spaced apart from each other in the direction perpendicular to the waveguide direction of the waveguide 16. The first device electrode 41 is arranged between the two second device electrodes 42.

The waveguide device 100 of the illustrated example includes a second waveguide that enables the electromagnetic wave to propagate between the waveguide 16 and the active device 40. An electrode for forming the second waveguide is typically arranged on the surface of the line substrate 90 to be brought into direct contact with the line substrate 90. More specifically, the waveguide device 100 includes a coplanar electrode pattern 50 arranged on the line substrate 90. The coplanar electrode pattern 50 and a portion of the line substrate 90 positioned below the coplanar electrode pattern 50 form a coplanar waveguide serving as an example of the second waveguide.

The line substrate 90 of the waveguide device 100 includes: a hole-formed portion 90*a* having the holes 12 periodically formed in the substrate 10; the waveguide 16 defined as a portion in the hole-formed portion 90*a* (semiconductor substrate 10) where the holes 12 are not formed; and any other portion 90*b* except the hole-formed portion 90*a*. The other portion 90*b* is typically free of the holes 12 formed therein. Although the holes 12 are periodically formed, holes, which are present at a period different from that of the holes 12 or are present alone, may be formed in the other portion 90*b* for suppressing the leakage of the electromagnetic wave and stray capacitance. In this case, a conductive film may be formed in each of the holes to cause the hole to serve as a so-called via hole that short-circuits the upper surface of the line substrate 90 and a surface opposite thereto to each other.

The coplanar electrode pattern 50 is in line with the waveguide 16 in the waveguide direction, and is arranged on the other portion 90*b* of the line substrate 90.

The coplanar electrode pattern 50 includes: a signal electrode 51 extending in the waveguide direction of the waveguide 16; and a ground electrode 52 having a U-shape when viewed in plan view, the shape being opened toward the waveguide 16. The signal electrode 51 is arranged on the inner side of the ground electrode 52, and is arranged to be spaced apart from the ground electrode 52. Thus, a void portion (slit) extending in the waveguide direction of the waveguide 16 is formed between the signal electrode 51 and the ground electrode 52. The signal electrode 51 is electrically connected to the first device electrode 41 of the active device 40 through a via 43. The ground electrode 52 is electrically connected to the second device electrodes 42 of the active device 40 through two vias 44.

The second waveguide is not limited to the coplanar waveguide, and may be formed as, for example, a microstrip waveguide or a waveguide tube-integrated waveguide.

In such waveguide device 100, the application of a voltage to the coplanar electrode pattern 50 generates an electric field between the signal electrode 51 and the ground electrode 52. In addition, the application of a voltage to the active device 40 causes the active device 40 to transmit the electromagnetic wave. The electromagnetic wave transmitted from the active device 40 is propagated toward the signal electrode 51 through the via 43, and is then coupled with the electric field formed between the signal electrode 51 and the ground electrode 52 to be propagated in the semiconductor substrate 10 toward the waveguide 16. The electromagnetic wave thus transmitted from the active device 40 is first propagated to the coplanar waveguide, and is then propagated to the waveguide 16.

In addition, the waveguide device 100 may include a second ground electrode positioned between the line substrate 90 and the support substrate 30, though the electrode is not shown. When the waveguide device includes the second ground electrode, the electric field generated between the signal electrode and the ground electrode can be suppressed from leaking from the line substrate to the support substrate. The second ground electrode may be arranged between the line substrate and the joining portion, or may be arranged between the joining portion and the support substrate. In addition, the above-mentioned joining portion may be formed from a metal to be caused to function as the second ground electrode.

A-2. Overall Configuration of Waveguide Device 101

Figure 4:
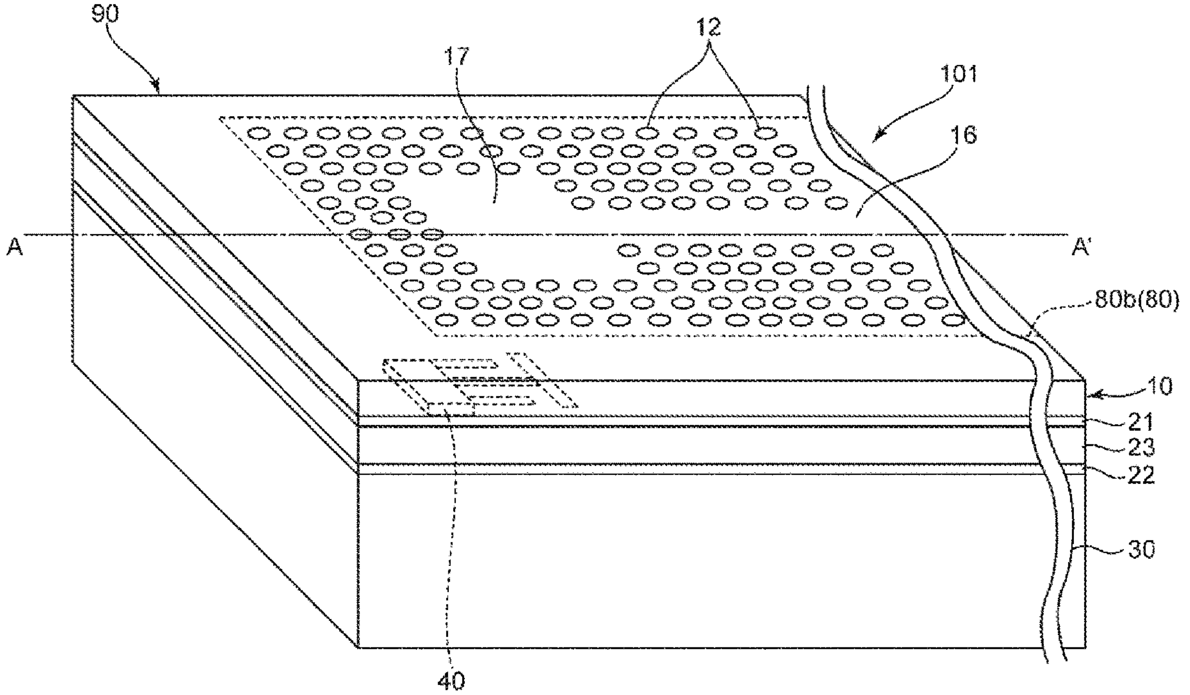
FIG. 4 is a schematic perspective view of a waveguide device according to another embodiment of the present invention.
Figure 5:
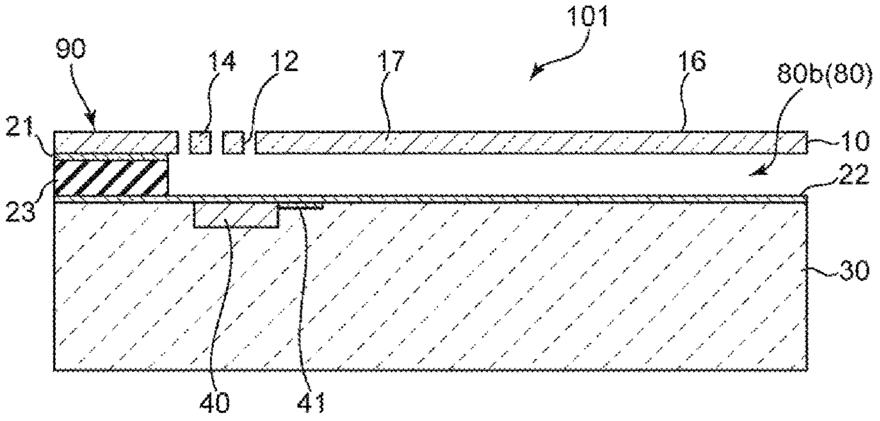
FIG. 5 is a sectional view of the waveguide device taken along the line AA' of FIG. 4.
Figure 6:
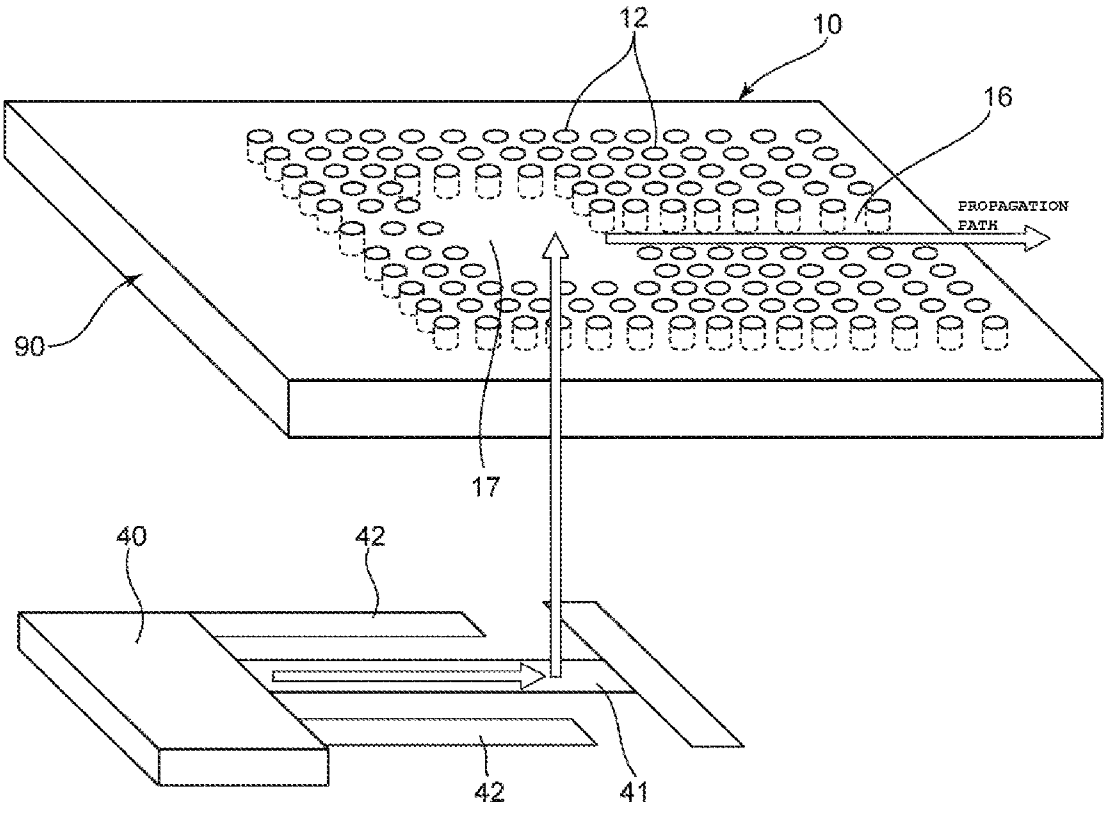
FIG. 6 is a schematic explanatory view for illustrating the propagation path of an electromagnetic wave in the waveguide device of FIG. 4.
Figure 7:
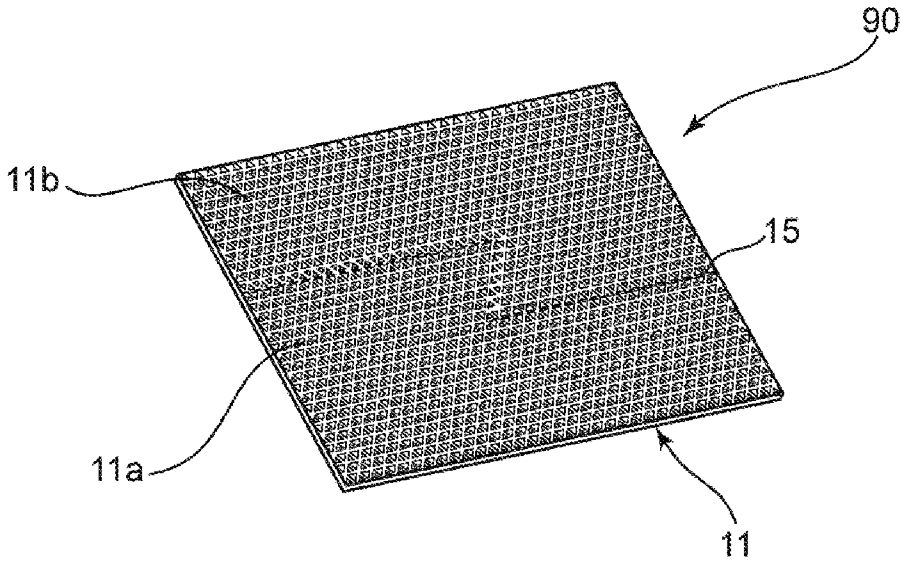
FIG. 7 is a schematic perspective view of a line substrate to be used in a waveguide device according to still another embodiment of the present invention.
Figure 8:
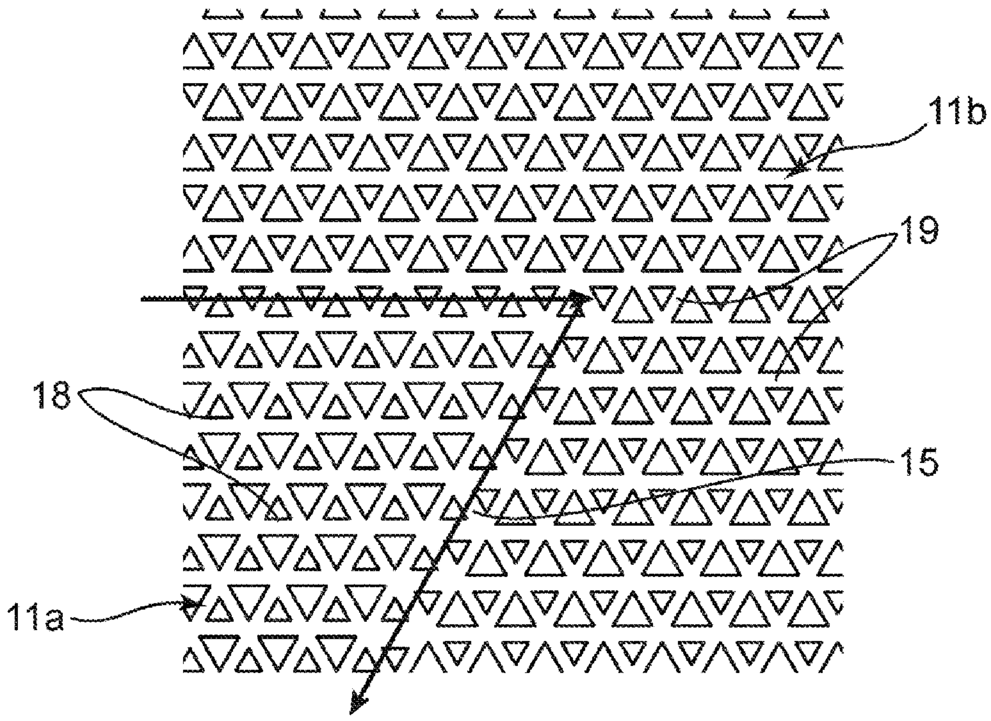
FIG. 8 is an enlarged plan view of the line substrate of FIG. 7.
Figure 9A:
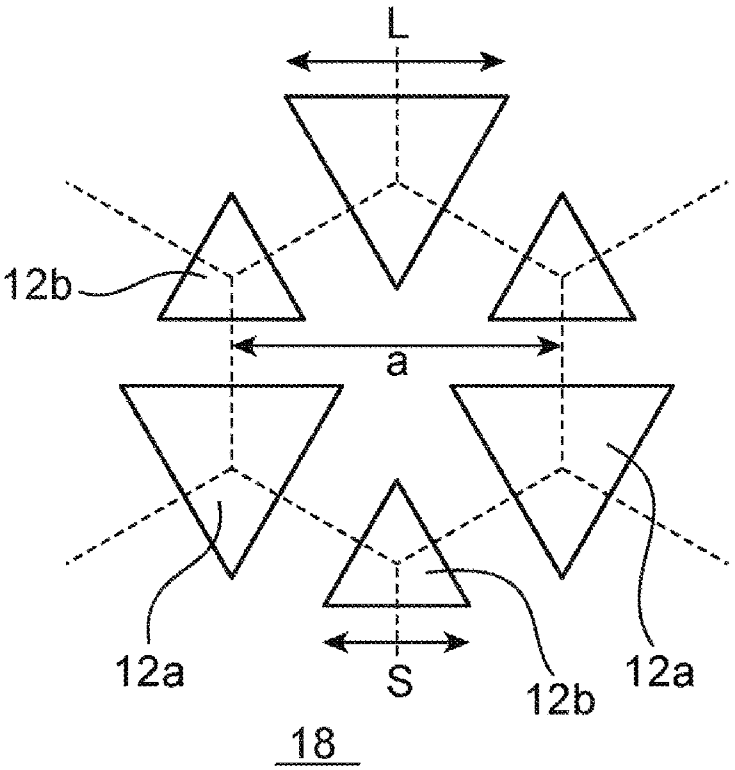
FIG. 9A and FIG. 9B are plan views of two different unit cells of the line substrate of FIG. 7.
Figure 9B:
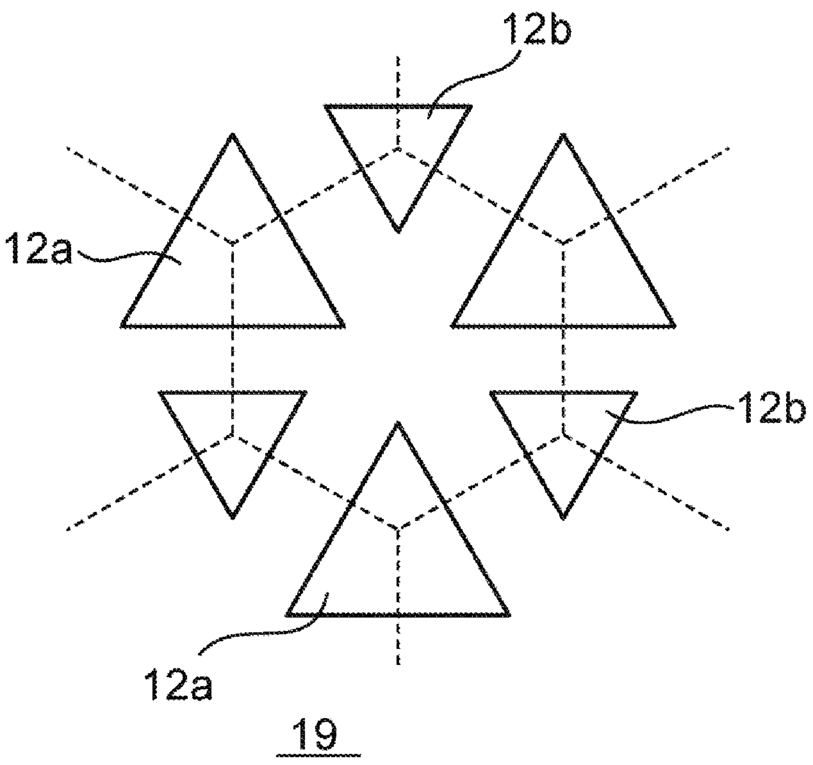

FIG. 4 is a schematic perspective view of a waveguide device according to another embodiment of the present invention, FIG. 5 is a sectional view of the waveguide device taken along the line AA' of FIG. 4, and FIG. 6 is a schematic explanatory view for illustrating the propagation path of an electromagnetic wave in the waveguide device of FIG. 4.

A waveguide device 101 of the illustrated example includes, in addition to the line substrate 90, the waveguide 16, the low-dielectric constant portion 80, and the support substrate 30, an insulating layer 23 positioned between the line substrate 90 and the support substrate 30. The insulating layer 23 of the illustrated example has a U-shape when viewed in plan view, the shape being opened toward one side in the waveguide direction of the waveguide 16. The thickness of the insulating layer 23 is, for example, 1 μm or more and 1 mm or less. A material for the insulating layer 23 is typically, for example, an inorganic material, and is specifically, for example, quartz glass. When the insulating layer 23 includes quartz glass, the insulating layer 23 can function as the above-mentioned low-dielectric constant portion.

The waveguide device 101 further includes: a joining portion 21 that directly joins the line substrate 90 and the insulating layer 23 to each other; and a joining portion 22 that directly joins the support substrate 30 and the insulating layer 23 to each other.

In the waveguide device 101, a cavity 80*b* serving as the low-dielectric constant portion 80 may be defined by the lower surface of the line substrate 90, the upper surface of the support substrate 30, and the insulating layer 23, or may be defined by the lower surface of the substrate 10, the joining portion 22 positioned on the upper surface of the support substrate 30, and the insulating layer 23.

In each of FIG. 4 to FIG. 6, only the joining portion 21, the insulating layer 23, and the joining portion 22 are arranged between the line substrate 90 and the support substrate 30. The line substrate and the insulating layer may be directly joined to each other without the arrangement of any joining portion, or the insulating layer and the support substrate may be directly joined to each other without the arrangement of any joining portion.

In addition, the waveguide device 101 includes the active device 40 supported by the support substrate 30 as in the waveguide device 100.

The waveguide device 101 of the illustrated example includes a resonator 17 that enables the electromagnetic wave to propagate between the waveguide 16 and the active device 40. The resonator 17 is typically a mode-gap confinement resonator, which includes a photonic crystal and is defined as a portion in the semiconductor substrate 10 where the holes 12 are not formed.

The line substrate 90 of the waveguide device 101 includes: the line-defect waveguide 16 defined as a portion where the holes 12 are not formed; and the mode-gap confinement resonator 17 defined as a portion where the holes 12 are not formed. The resonator 17 can receive the electromagnetic wave transmitted from the active device 40, and can transmit the received electromagnetic wave to the waveguide 16.

The resonator 17 is in line with the waveguide 16 in the waveguide direction of the waveguide 16, and is continuous with the waveguide 16. The width (dimension in the direction perpendicular to the waveguide direction of the waveguide 16) of the resonator 17 is larger than the width of the waveguide 16. In the illustrated example, the waveguide 16 is sandwiched between the holes arranged in five rows on each side thereof, and the resonator 17 is surrounded by the holes arranged in three rows on each side thereof. In addition, the resonator 17 overlaps the cavity 80*b* in the thickness direction of the semiconductor substrate 10.

In such waveguide device 101, when a voltage is applied to the active device 40, the first device electrode 41 functions as an antenna, and hence the electromagnetic wave is transmitted from the first device electrode 41 toward the resonator 17. The electromagnetic wave that has reached the resonator 17 is i received by the resonator 17, and is then transmitted from the resonator 17 to the waveguide 16 through a continuous portion between the resonator 17 and the waveguide 16. After that step, the electromagnetic wave is propagated to the waveguide 16.

In addition, the mode-gap confinement resonator can receive the electromagnetic wave, and can transmit the received electromagnetic wave, and hence can function as an antenna that receives and transmits an electromagnetic wave having a specific frequency. In addition, an antenna including a photonic crystal is not limited to the mode-gap confinement resonator. Even a photonic crystal structure free of a portion where no holes are formed can trap an electromagnetic wave having a specific frequency, the wave entering from the outside. The effect can reversibly emit the electromagnetic wave. Accordingly, even the photonic crystal structure free of a portion where no holes are formed can function as an antenna. Further, when a conductive layer (i.e., mirror surface) is formed on the lower surface of the photonic crystal, a specific frequency band is widened by a gap "s" therebetween, and hence an antenna that transmits and receives electromagnetic waves in a wide band can be formed.

In each of FIG. 1 to FIG. 6, the following example has been illustrated: the active device has a function of transmitting (generating and radiating) an electromagnetic wave, and the electromagnetic wave transmitted from the active device is coupled with the waveguide through the second waveguide or the resonator. However, in each of those figures, the following embodiment is easily conceivable: the active device has a function of receiving an electromagnetic wave, and the electromagnetic wave guided in the waveguide is coupled with the active device through the second waveguide or the resonator.

A-3. Overall Configuration of Waveguide Device 102

Figure 10:
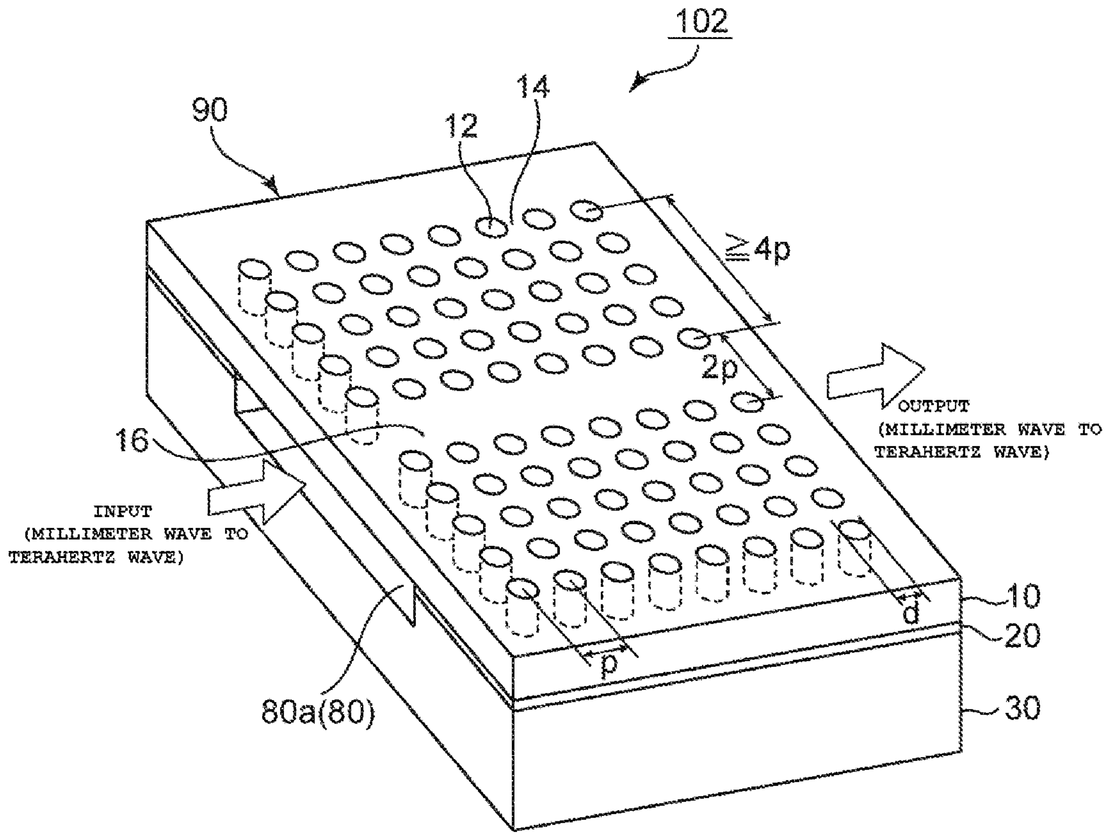
FIG. 10 is a schematic perspective view of a waveguide device according to still another embodiment of the present invention.

FIG. 10 is a schematic perspective view of a waveguide device according to still another embodiment of the present invention.

Each of the above-mentioned waveguide devices 100 and 101 includes the active device 40 supported by the support substrate 30, and is configured to be capable of propagating an electromagnetic wave between the waveguide 16 and the active device 40. However, the waveguide device of the present invention may be free of the active device 40. A waveguide device 102 free of the active device 40 is illustrated in FIG. 10. In such waveguide device 102, an electromagnetic wave (e.g., a millimeter wave to tetrahertz wave) from a separately prepared active device may be input into one side of the waveguide 16 and output from an opposite side of the waveguide 16.

As used herein, the term "waveguide device" encompasses both of a wafer having formed thereon at least one waveguide device (waveguide device wafer) and a chip obtained by cutting the waveguide device wafer.

B. Line Substrate

B-1. Semiconductor Substrate

The semiconductor substrate 10 has an upper surface exposed to the outside and a lower surface positioned in a composite substrate. The semiconductor substrate 10 includes a semiconductor material. Any appropriate material may be used as the semiconductor material as long as an effect exhibited by the embodiment of the present invention is obtained. Typical examples of such material include silicon, aluminum nitride, and silicon carbide. The semiconductor substrate 10 preferably includes silicon. The semiconductor substrate 10 does not include a sintered body of semiconductor material powder, but includes a single crystal obtained by, for example, a Czochralski (CZ) method or a floating zone (FZ) method. Accordingly, the porosity of the semiconductor substrate 10 is as follows: pores each having a pore size of 1 μm or more are present at a ratio of less than 0.5 ppm. The term "pores" as used herein means bubbles (fine pores) in the substrate itself, and the bubbles are different from the holes formed for forming a photonic crystal or an effective dielectric medium.

B-2. Photonic Crystal

As described above, the line substrate 90 has the holes 12 periodically formed in the semiconductor substrate 10. The line substrate 90 includes a photonic crystal or an effective dielectric medium.

The photonic crystal for forming the line substrate 90 is a multidimensional periodic structural body formed by arranging a medium having a large refractive index and a medium having a small refractive index at a period comparable to the wavelength of light, and has the band structure of the light similar to the band structure of an electron. Accordingly, a appropriate design of the periodic structure can express forbidden band (photonic band gap) for predetermined light. A photonic crystal having a forbidden band functions as an object that neither reflects nor transmits light having a predetermined wavelength. The introduction of a line defect that disturbs periodicity into the photonic crystal having a photonic band gap results in the formation of a waveguide mode in the frequency region of the band gap, and hence can achieve a waveguide that propagates an electromagnetic wave with a low loss.

The photonic crystal is typically a slab-type two-dimensional photonic crystal. The slab-type two-dimensional photonic crystal refers to a photonic crystal obtained by: arranging, on a semiconductor thin-plate slab, low-refractive index columns each having a circular columnar or polygonal columnar shape, the columns each having a refractive index lower than the refractive index of a material for forming the thin-plate slab, at appropriate two-dimensional periodic intervals in accordance with purposes and a desired photonic band gap; and vertically sandwiching the thin-plate slab between an upper clad and a lower clad each having a refractive index lower than that of the thin-plate slab. In the illustrated example, the holes 12 function as the low-refractive index columns, a portion 14 between the holes 12 of the semiconductor substrate 10 functions as a high-refractive index portion, the low-dielectric constant portion (cavity) functions as the lower clad, and an external environment (air portion) above the line substrate 90 functions as the upper clad. A portion in the semiconductor substrate 10 where the periodic pattern of the holes 12 is not formed serves as a line defect, and the line defect portion forms the waveguide 16.

As described above, the holes 12 may be formed as a periodic pattern. The holes 12 are typically arrayed so as to form regular lattices. Any appropriate form may be adopted as the form of each of the lattices as long as a predetermined photonic band gap can be achieved. Typical examples thereof include a triangular lattice and a square lattice. In one embodiment, the holes 12 may be through-holes. The through-holes are easy to form, and as a result, their refractive indices are easy to adjust. Any appropriate shape may be adopted as the plan-view shape of each of the holes (through-holes). Specific examples thereof include equilateral polygons (e.g., an equilateral triangle, a square, an equilateral pentagon, an equilateral hexagon, and an equilateral octagon), a substantially circular shape, and an elliptical shape. Of those, a substantially circular shape is preferred.

The long diameter-to-short diameter ratio of the substantially circular shape is preferably from 0.90 to 1.10, more preferably from 0.95 to 1.05. As described above, the through-holes 12 may be low-refractive index columns (columnar portions each including a low-refractive index material). However, the through-holes are easier to form. In addition, the through-holes each include air having the lowest refractive index, and hence a difference in refractive index between each of the through-holes and the waveguide can be enlarged. In addition, the diameters of some of the holes may be different from the diameters of the other holes, and some of the hole periods may also be different from the other hole periods.

When the line substrate includes the photonic crystal, the lattice pattern of its holes may be appropriately set in accordance with the purposes and the desired photonic band gap. In the illustrated example, the holes each having a diameter "d" form square lattices at a period P. Although the square lattices are formed in the illustrated example, appropriate setting of, for example, the diameters and periods of the holes enables even triangular lattices to provide the same action, function, and effect. The square lattice patterns are formed on both the sides of the waveguide device, and the waveguide 16 is formed in the central portion thereof where no lattice pattern is formed. The length of the waveguide 16 is preferably 30 mm or less, more preferably from 0.1 mm to 10 mm. The width of the waveguide 16 may be, for example, from 1.01P to 3P (2P in the illustrated example) with respect to the hole period P. The number of the rows of the holes (hereinafter sometimes referred to as "lattice rows") in the waveguide direction may be from 3 to 10 (5 in the illustrated example) on each side of the waveguide. The hole period P may satisfy, for example, the following relationship:

$$(1/7)\times(\lambda/n)\leq P\leq 1.4\times(\lambda/n)$$

where λ represents the wavelength (μm) of the electromagnetic wave to be introduced into the waveguide, and "n" represents the refractive index of the semiconductor substrate. The refractive index of the substrate is proportional to the ½-th power of the dielectric constant Er thereof, and hence the "n" in the above-mentioned formula may be replaced with "$(\varepsilon r)^{1/2}$". The hole period P is preferably from 10 μm to 1 mm, more preferably from 200 μm to 800 μm. In one embodiment, the hole period P may be comparable to the thickness of the photonic crystal (semiconductor substrate). The diameter "d" of each of the holes is preferably from 0.1P to 0.9P, more preferably from 0.2P to 0.6P with respect to the hole period P.

The width of the lattice pattern is preferably 10P or more, more preferably from 12P to 20P. The width of the lattice pattern is a distance between the outermost lattice row in the lattice pattern on one side of the waveguide and the outermost lattice row in the lattice pattern on the other side of the waveguide. Accordingly, the width of the lattice pattern on one side of the waveguide is 4P or more (i.e., ≥4P), as illustrated in FIG. 1, for example.

The desired photonic band gap may be obtained by appropriately adjusting, for example, the diameter "d" of each of the holes, the hole period P, the number of the lattice rows, the number of the holes in one lattice row, the thickness of the semiconductor substrate, a material for forming the semiconductor substrate (substantially, its refractive index), the width of the line defect portion, and the width and height of the cavity in combination. More specifically, when the line substrate includes a photonic crystal having periodic holes formed in a silicon substrate, its normalized frequency P/λ exceeds 0.23.

B-3. Effective Dielectric Medium

When the line substrate includes an effective dielectric medium, in the waveguide device, the frequency range of such an electromagnetic wave that the absolute value of its propagation loss becomes 1 dB/cm or less is typically 50 GHz or more. In other words, the waveguide device can function as a so-called "broadband waveguide device" that shows a small propagation loss over a wide frequency range. Such broadband characteristic may be typically achieved by turning the periodic pattern of the holes 12 in the semiconductor substrate 10 into a hole pattern in which no photonic band gap (forbidden band) is formed (i.e., by adopting a configuration that is not a photonic crystal). Such effective dielectric medium may be referred to as "effective dielectric clad (EMC)."

When the line substrate includes the effective dielectric medium, its normalized frequency P/A may be, for example, from 0.05 to 0.3, may be, for example, from 0.05 to 0.025, may be, for example, from 0.1 to 0.03, or may be, for example, from 0.1 to 0.025. In addition, for example, when the line substrate includes an effective dielectric medium having periodic holes formed in a silicon substrate, its normalized frequency P/λ is 0.2 or less.

When the normalized frequency P/λ falls within such ranges, an electromagnetic wave is not diffracted by the periodic holes, and the periodic holes each effectively function as a low-dielectric constant portion. The foregoing means the periodic holes each behave as a clad in optical fiber terms. In the case of a photonic crystal, the wavelength dispersion characteristic of its propagation constant largely changes, and hence its group refractive index increases. Accordingly, the propagation speed of a signal pulse is small, and hence a problem in that the pulse is delayed becomes remarkable. Meanwhile, in the case of an EMC mode, its effective dielectric constant (refractive index) can be reduced, and hence its group velocity does not reduce. Thus, the delay of a signal pulse can be suppressed.

When the line substrate includes the effective dielectric medium, its hole period P is preferably 50 μm or more, more preferably from 50 μm to 1 mm, still more preferably from 200 μm to 800 μm. The variation of the hole period P is preferably P/100 (0.01P) or more, more preferably from 0.05P to 0.3P. As described above, when the EMC mode is adopted, the wavelength of an electromagnetic wave to be propagated is not present in a photonic band. Accordingly, there is no need to form a photonic band gap, and hence some degree of variation in accuracy (typically, hole period) of the hole pattern is allowed.

In addition, the effective dielectric medium has a feature in that the medium can propagate the electromagnetic wave in any polarization direction.

When the line substrate includes the effective dielectric medium, the diameter "d" of each of its holes is preferably P/100 (0.01P) or more, more preferably from 0.7P to 0.96P, still more preferably from 0.8P to 0.94P with respect to the hole period P. When the diameter "d" of each of the holes and the hole period P satisfy such relationships, both of the following effects can be achieved: a reduction in effective dielectric constant of the substrate and the retention of the mechanical strength thereof.

The line substrate 90 illustrated in each of FIG. 1 to FIG. 6 includes the line-defect waveguide 16 defined as a portion in the semiconductor substrate 10 where the holes 12 are not formed. Although the waveguide 16 has a belt shape (linear shape) in the illustrated example, a waveguide having a predetermined shape (consequently, a predetermined waveguide direction) can be formed by changing the lattice pattern. For example, the waveguide may extend in a direction (oblique direction) having a predetermined angle with respect to the long-side direction or short-side direction of the waveguide device, or may be bent at a predetermined site (its waveguide direction may change at the predetermined site).

B-4. Valley Photonic Crystal

In addition, as illustrated in each of FIGS. 7, 8, 9A and 9B, the line substrate 90 may be a valley photonic crystal layer 11 in which a boundary between regions formed of two different unit cells functions as a waveguide.

The valley photonic crystal layer 11 includes: a first region 11*a* formed of a plurality of first unit cells 18; and a second region 11*b* formed of a plurality of second unit cells 19. The first region 11*a* and the second region 11*b* are adjacent to each other, and a boundary portion between the first region 11*a* and the second region 11*b* is formed as a waveguide 15.

Each of the first unit cells 18 and the second unit cells 19 has two kinds of holes, which have different sizes, periodically formed in the semiconductor substrate 10. The holes are typically arrayed so as to form regular lattices. Any appropriate form may be adopted as the form of each of the lattices as long as a desired photonic band gap can be achieved in a waveguide for waves ranging from a millimeter wave to a terahertz wave.

In each of the first unit cells 18 and second unit cells 19 of the illustrated example, three first holes 12*a* that are relatively large and three second holes 12*b* that are relatively small are arranged so as to form a honeycomb lattice (hexagonal lattice). In each unit cell, the first holes 12*a* and the second holes 12*b* are alternately arranged. The first unit cell 18 and the second unit cell 19 are in a 180° rotational symmetry (line symmetry) relationship. When the first unit cell 18 is rotated by 180° about the center of the lattice, the unit cell coincides with the second unit cell 19.

Each of the first holes 12*a* and the second holes 12*b* typically has an equilateral triangle shape. The length L of one side of each of the first holes 12*a* satisfies the following formula (3), and the length S of one side of each of the second holes 12*b* satisfies the following formula (4):

$$L = \frac{1.3a}{\sqrt{3}} \quad (3)$$

$$S = \frac{0.7a}{\sqrt{3}} \quad (4)$$

where L represents the length (μm) of one side of the first hole, S represents the length (μm) of one side of the second hole, and "a" represents an interval (μm) between opposite sides in the honeycomb lattice.

For example, when an electromagnetic wave having a frequency of 300 GHz is used, the interval between the opposite sides in the honeycomb lattice is preferably 250 μm or more and 500 μm or less, particularly preferably 400 μm.

The waveguide 15 can propagate waves ranging from a millimeter wave to a terahertz wave while confining the waves therein with the holes 12, and is formed in the boundary portion between the first region 11*a* and the second region 11*b*. The waveguide 15 of the illustrated example is bent at a predetermined site (its waveguide direction changes at the predetermined site). However, when the shapes of the first region 11*a* and the second region 11*b* are changed to change the shape of the boundary therebetween, a waveguide having a desired shape can be formed. For example, the waveguide may extend in a linear fashion along the long-side direction or short-side direction of the photonic crystal device without bending, or may extend in a direction (oblique direction) having a predetermined angle with respect to the long-side direction or short-side direction of the photonic crystal device.

C. Joining Portion

As illustrated in FIG. 1, the joining portion 20 typically integrates the semiconductor substrate 10 and the substrate 30 with each other through direct joining. In addition, as illustrated in FIG. 4, the joining portion 21 integrates the semiconductor substrate 10 and the insulating layer 23 with each other through direct joining. The joining portion 22 integrates the insulating layer 23 and the support substrate 30 with each other through direct joining.

The joining portion may be one layer, or may be a laminate of two or more layers. The joining portion typically includes an inorganic material. Examples of the joining portion include a $SiO_2$ layer, an amorphous silicon layer, and a tantalum oxide layer. In addition, the joining portion may include a metal selected from gold (Au), titanium (Ti), platinum (Pt), chromium (Cr), copper (Cu), tin (Sn), or combinations (alloys) thereof. Of those joining portions, an amorphous silicon layer is a preferred example. In addition, from the viewpoints of securing adhesive strength and preventing migration, a metal film of Ti, Cr, Ni, Pt, or Pd may be formed as an intermediate layer between the line substrate and the support substrate or between the insulating layer and the line substrate or the support substrate. The thickness of the joining portion is, for example, 0.001 μm or more and 10 μm or less, preferably 0.1 μm or more and 3 μm or less.

The direct joining may be achieved by, for example, the following procedure. In a high-vacuum chamber (e.g., about $1\times10^{-6}$ Pa), the joining surface of each of components (layers or substrates) to be joined to each other is irradiated with a neutralized beam. Thus, each joining surface is activated. Then, in a vacuum atmosphere, the activated joining surfaces are brought into contact with each other, and are joined to each other at normal temperature. A load at the time of the joining may be, for example, from 100 N to 20,000 N. In one embodiment, when the surface activation with the neutralized beam is performed, an inert gas is introduced into a chamber, and a high voltage is applied from a DC power source to an electrode arranged in the chamber. With such configuration, an electric field generated between the electrode (positive electrode) and the chamber (negative electrode) causes electrons to move to generate atomic and ion beams derived from the inert gas. Among the beams that have reached a grid, the ion beam is neutralized at the grid, and hence a beam of neutral atoms is emitted from a high-speed atomic beam source. An atomic species for forming the beam is preferably an inert gas element (e.g., argon (Ar) or nitrogen (N)). At the time of the activation by beam irradiation, a voltage is, for example, from 0.5 kV to 2.0 kV, and a current is, for example, from 50 mA to 200 mA. The method for the direct joining is not limited thereto, and, for example, a surface activation method including using a fast atom beam (FAB) or an ion gun, an atomic diffusion method, or a plasma joining method may be applied.

D. Low-Dielectric Constant Portion

As illustrated in FIG. 1, the width of the low-dielectric constant portion 80 (cavity 80*a*, 80*b*) is typically larger than the width of the waveguide. The low-dielectric constant portion 80 (cavity 80*a*, 80*b*) preferably extends up to at least the third lattice row from the waveguide. Light propagates in the waveguide, and moreover, part of its light energy diffuses up to the lattice row near the waveguide in some cases. Accordingly, the arrangement of the cavity directly below such lattice row can suppress a propagation loss. From this viewpoint, the low-dielectric constant portion 80 (cavity 80*a*, 80*b*) more preferably extends up to the fifth lattice row from the waveguide, and the low-dielectric constant portion 80 (cavity 80*a*, 80*b*) particularly preferably extends so as to overlap the entire region of the hole-formed portion in the thickness direction of the line substrate 90.

When the low-dielectric constant portion is a $SiO_2$ layer or a quartz glass plate, the low-dielectric constant portion is positioned between the line substate and the support substrate.

E. Substrate

As illustrated in FIG. 1, the support substrate 30 has an upper surface positioned in the composite substrate and a lower surface exposed to the outside. The support substrate 30 is arranged for improving the strength of the composite substrate, and thus, the thickness of the semiconductor substrate can be reduced. Any appropriate configuration may be adopted as the support substrate 30. Specific examples of a material for forming the support substrate 30 include indium phosphide (InP), silicon (Si), glass, SiALON ($Si_3N_4$—$Al_2O_3$), mullite ($3Al_2O_3 \cdot 2SiO_2$, $2Al_2O_3 \cdot 3SiO_2$), aluminum nitride (AlN), magnesium oxide (MgO), aluminum oxide ($Al_2O_3$), spinel ($MgAl_2O_4$), sapphire, quartz, crystal, gallium nitride (GaN), silicon carbide (Sic), silicon nitride ($Si_3N_4$), and gallium oxide ($Ga_2O_3$).

The support substrate 30 preferably includes at least one kind selected from the group consisting of: indium phosphide; silicon; aluminum nitride; silicon carbide; and silicon nitride, and more preferably includes silicon or indium phosphide.

The linear expansion coefficient of the material for forming the support substrate 30 is preferably as close to the linear expansion coefficient of the material for forming the semiconductor substrate 10 as possible. With such configuration, the thermal deformation (typically, warpage) of the composite substrate can be suppressed. The linear expansion coefficient of the material for forming the support substrate 30 preferably falls within the range of from 50% to 150% with respect to the linear expansion coefficient of the material for forming the semiconductor substrate 10. From this viewpoint, the support substrate may include the same material as that of the semiconductor substrate.

EXAMPLES

Now, the present invention is specifically described by way of Examples. However, the present invention is not limited to these Examples. A method of measuring the propagation loss of a waveguide device is as described below.

Example 1

A waveguide device illustrated in each of FIG. 1 to FIG. 3 was produced.

1-1. Preparation of Support Substrate

A support substrate having a resonance tunnel diode (active device) formed (buried) in a 3-inch InP wafer was prepared. A resist film was patterned on the upper surface of the InP wafer so that a portion in the InP wafer positioned directly below the entirety of a periodic hole portion to be formed in a silicon wafer serving as a line substrate was exposed. After that step, the portion of the InP wafer exposed from the resist film was subjected to dry etching by reactive ion etching. Thus, a depressed portion (hollow structure) was formed. The depth of the etching of the depressed portion was set to 150 μm. Thus, the InP wafer (support substrate) having the depressed portion was prepared.

1-2. Formation of Joining Portion (Joining Layers)

After that step, a $SiO_2$ film having a thickness of 1 μm and an amorphous silicon film having a thickness of 0.2 μm were formed as joining layers on the InP wafer having the depressed portion formed therein by sputtering. After the film formation, the amorphous silicon film was subjected to planarization treatment by being polished. Here, the arithmetic average roughness of a 010 μm (10 μm square area; the same applies hereinafter) on the surface of the amorphous silicon film was measured with an atomic force microscope. As a result, the arithmetic average roughness was 0.2 nm.

1-3. Composite Wafer Formation (Direct Joining)

Next, a 3-inch silicon wafer (semiconductor substrate) having a thickness of 525 μm was prepared. The arithmetic average roughness of the surface of a 010 μm on the surface of the silicon wafer was measured with an atomic force microscope, and was found to be 0.2 nm.

The amorphous silicon surface of the InP wafer having formed therein the resonance tunnel diode and the silicon wafer were directly joined to each other as described below. First, the InP wafer and the silicon wafer were loaded into a vacuum chamber, and in a vacuum of the order of $10^{-6}$ Pa, both joining surfaces (the amorphous silicon surface of the InP wafer and the surface of the silicon wafer) were irradiated with a high-speed Ar neutral atom beam (acceleration voltage: 1 kV, Ar flow rate: 60 sccm) for 70 seconds. After the irradiation, the InP wafer and the silicon wafer were left standing to cool for 10 minutes, and then the joining surfaces of the InP wafer and the silicon wafer (beam-irradiated surfaces of the InP wafer and the surface of the silicon wafer) were brought into contact with each other, followed by pressurization at 4.90 kN for 2 minutes to join the InP wafer and the silicon wafer to each other. That is, the InP wafer and the silicon wafer were directly joined to each other via the amorphous silicon layer and the $SiO_2$ film (joining portion).

Next, the silicon surface of the composite wafer obtained by the joining was polished so that the composite wafer was thinned until the thickness of the silicon wafer became 230 μm. In the resultant silicon/InP composite substrate, a failure such as peeling was not observed at the joining interface.

1-4. Formation of Holes

Next, a resist was applied onto the silicon wafer, and then a resist pattern having a hole pattern corresponding to periodic holes and a via hole was formed by photolithography. After that step, silicon and $SiO_2$ exposed from the resist pattern were subjected to dry etching by reactive ion etching so that the periodic holes, which were arranged at a period of 240 μm and each had a hole radius of 72 μm, and the via hole were formed in the silicon wafer. Thus, the holes were periodically formed in the silicon wafer, and a line substrate was formed as a photonic crystal (two-dimensional photonic crystal slab). The two-dimensional photonic crystal slab included a line-defect waveguide defined as a portion where the holes were not formed, and the length of the line-defect waveguide in its waveguide direction was 10 mm.

1-5. Formation of Coplanar Electrode Pattern

Next, a resist was applied onto the silicon wafer again, and the resist was patterned by photolithography so that a portion where a coplanar electrode pattern was to be formed and the via hole portion were exposed, and the periodic hole portion was masked. After that step, a Cr film having a thickness of 50 nm and a Ni film having a thickness of 100 nm were formed on the upper surface of the silicon wafer exposed from the resist by sputtering to form an underlying electrode. In addition, a Cr film and a Ni film were also formed on the inner surface of the via hole so that conduction was able to be established between an electrode of the resonance tunnel diode on the InP substrate and the underlying electrode on silicon. Further, copper was formed into a film on the underlying electrode by electroplating to form the coplanar electrode pattern.

Finally, the joining layer $SiO_2$ in the depressed portion (hollow structure) of the InP wafer was removed by wet etching with buffered hydrofluoric acid (BHF) through the periodic hole portion of the silicon wafer.

Thus, the waveguide device was obtained. In the waveguide device, the depressed portion of the InP wafer and the lower surface of the silicon wafer defined a cavity serving as a low-dielectric constant portion. The thickness of the cavity was the same as the depth of the etching of the depressed portion, that is, 150 μm.

1-6. Calculation of Propagation Loss

To measure the propagation loss of the line-defect waveguide, three waveguide devices with respective line-defect waveguides had lengths of 30 mm, 40 mm, and 50 mm were produced in the same manner as that described above.

Next, the application of a voltage to the resonance tunnel diode (active device) of each of the waveguide devices was enabled. In addition, a receiving antenna and a RF signal receiver were connected to the output side of each of the line-defect waveguides.

Next, a voltage was applied to the resonance tunnel diode to cause the resonance tunnel diode to transmit an electromagnetic wave having a frequency shown in Table 1. Thus, the electromagnetic wave was introduced into the line-defect waveguide through a coplanar waveguide. The RF signal receiver measured the RF power of the electromagnetic wave output from the line-defect waveguide. The propagation losses (dB/cm) were calculated from the measurement results of the three waveguide devices having different waveguide lengths, and were evaluated by the following criteria. The results are shown in Table 1.

⊚ (excellent): less than 0.5 dB/cm

○ (good): 0.5 dB/cm or more and less than 1 dB/cm

Δ (acceptable): 1 dB/cm or more and less than 2 dB/cm x (unacceptable): 2 dB/cm or more Example 2

A waveguide device illustrated in each of FIG. 4 to FIG. 6 was produced.

2-1. Preparation of Support Substrate and Insulating Layer

First, a wafer (support substrate) having a resonance tunnel diode (active device) formed (buried) in a 3-inch InP wafer subjected to planarization treatment was prepared in the same manner as in Example 1.

In addition, 3-inch quartz glass having a thickness of 0.3 mm was prepared as an insulating layer. The quartz glass was subjected to boring processing with a water jet so that a portion directly below periodic holes and an antenna portion to be formed in a silicon wafer to be joined later became a hollow structure. Thus, the quartz glass (insulating layer) was formed into a U-shape when viewed in plan view.

2-2. Formation of Joining Portion (Joining Layer)

Next, an amorphous silicon film having a thickness of 0.1 μm was formed as a joining layer on one surface of the quartz glass subjected to the boring processing. After the film formation, the amorphous silicon film was subjected to planarization treatment by being polished. Here, the arithmetic average roughness of a 10 μm on the surface of the amorphous silicone film and the arithmetic average roughness of the surface of silicon were measured with an atomic force microscope. As a result, the arithmetic average roughnesses were each 0.2 nm in terms of value of a □10 μm.

2-3. Composite Wafer Formation (Direct Joining)

After that step, the InP wafer and the synthetic quartz glass wafer were directly joined to each other. The direct joining was performed in the same manner as in Example 1. That is, the InP wafer and the quartz glass wafer were directly joined to each other via the amorphous silicon layer and the $SiO_2$ film (joining portion). In the resultant synthetic quartz glass/InP composite substrate, a failure such as peeling was not observed at the joining interface.

Then, synthetic quartz glass was polished to a thickness of 150 μm. Next, an amorphous silicon film having a thickness of 0.1 μm was formed as a joining layer on the polished surface of the quartz glass, and the film-formed surface was subjected to planarization treatment. The arithmetic average roughness of the surface of the amorphous silicon was measured. As a result, the arithmetic average roughness was 0.2 nm in terms of value of a □10 μm.

Next, a 3-inch silicon wafer (semiconductor substrate) having a thickness of 525 μm was prepared, and the second direct joining of the silicon wafer and the synthetic quartz glass/InP composite substrate was performed. That is, the quartz glass wafer and the silicon wafer were directly joined to each other via the amorphous silicon layer (joining portion).

Next, the silicon surface of the composite wafer obtained by the joining was polished so that the composite wafer was thinned until the thickness of the silicon wafer became 230 μm. In the resultant silicon/InP composite substrate, a failure such as peeling was not observed at the joining interface.

2-4. Formation of Holes

Next, a resist was applied onto the silicon wafer, and then a resist pattern having a hole pattern corresponding to periodic holes and an antenna was formed by photolithography. After that step, silicon and $SiO_2$ exposed from the resist pattern were subjected to dry etching by reactive ion etching so that the periodic holes, which were arranged at a period of 240 μm and each had a hole radius of 72 μm, and the antenna were formed in the silicon wafer. Thus, the holes were periodically formed in the silicon wafer, and a line substrate was formed as a photonic crystal (two-dimensional photonic crystal slab). The two-dimensional photonic crystal slab included a line-defect waveguide defined as a portion where the holes were not formed, and a mode-gap confinement resonator defined as a portion where the holes were not formed, and the length of the line-defect waveguide in its waveguide direction was 10 mm.

Thus, the waveguide device was obtained.

2-5. Calculation of Propagation Loss

In addition, to measure the propagation loss of the line-defect waveguide, three waveguide devices whose line-defect waveguides had lengths of 30 mm, 40 mm, and 50 mm were produced in the same manner as that described above. Next, in the same manner as in Example 1, the application of a voltage to the resonance tunnel diode (active device) of each of the waveguide devices was enabled, and a receiving antenna and a RF signal receiver were connected to the output side of each of the line-defect waveguides, followed by the measurement of the RF power of an electromagnetic wave output from the line-defect waveguide with the RF signal receiver. The propagation losses of the waveguide devices of Example 2 were evaluated in the same manner as in Example 1. The results are shown in Table 1.

Examples 3 to 5

Waveguide devices were each produced in the same manner as in Example 1 except that: the depth of the etching of the depressed portion was changed; and the thickness of the cavity was changed to a value shown in Table 1.

The propagation losses of the resultant waveguide devices were calculated and evaluated in the same manner as in Example 1. The results are shown in Table 1.

Example 6

A waveguide device was produced in the same manner as in Example 1 except that the InP wafer serving as the support substrate was changed to a silicon wafer.

The propagation loss of the resultant waveguide device was calculated and evaluated in the same manner as in Example 1. The results are shown in Table 1.

Example 7

A waveguide device was produced in the same manner as in Example 2 except that the InP wafer serving as the support substrate was changed to a silicon wafer.

The propagation loss of the resultant waveguide device was calculated and evaluated in the same manner as in Example 1. The results are shown in Table 1.

Example 8

First, a wafer having a resonance tunnel diode (active device) formed (buried) in a 3-inch InP wafer (support substrate) subjected to planarization treatment was prepared in the same manner as in Example 1.

Next, a $SiO_2$ layer (thickness: 1 μm) serving as a low-dielectric constant portion was formed on the upper surface of the InP wafer (support substrate) by sputtering. The arithmetic average roughness Ra of the formed $SiO_2$ layer was reduced by CMP polishing. After that step, the film-formed surface was washed, and $Ta_2O_5$ (tantalum oxide layer) having a thickness of 0.1 μm was formed thereon by sputtering.

Next, a quartz glass plate (quartz glass wafer) having a thickness of 0.5 mm was prepared, and $Ta_2O_5$ (tantalum oxide layer) having a thickness of 0.1 μm was formed thereon by sputtering, followed by a reduction in arithmetic average roughness Ra of the layer by CMP polishing. After the InP wafer and the quartz glass wafer had been washed, the arithmetic average roughness Ra of a □10 μm on the surface of each of $Ta_2O_5$ on the InP wafer and $Ta_2O_5$ on the quartz glass wafer was measured with an atomic force microscope. As a result, the arithmetic average roughness of the former $Ta_2O_5$ was 0.5 nm, and that of the latter $Ta_2O_5$ was 0.5 nm. Dirt on the film-formed surface of each of the substrates was removed by washing the surface, and then the substrates were loaded into a vacuum chamber. The joining surface of each substrate was irradiated with a high-speed Ar neutral atom beam (acceleration voltage: 1 kV, Ar flow rate: 60 sccm) in a vacuum of the order of $10^{-6}$ Pa for 70 seconds. After the irradiation, each substrate was left standing to cool by being left as it was for 10 minutes, and then the respective beam-irradiated surfaces of the InP wafer and the quartz glass wafer were brought into contact with each other, followed by pressurization at 4.90 kN for 2 minutes to join both the substrates to each other. That is, the quartz glass wafer and the InP wafer having arranged thereon the $SiO_2$ layer were directly joined to each other via the tantalum oxide layers (joining portion). After the joining, polishing processing was performed until the thickness of the quartz glass wafer became 150 μm. Thus, a composite wafer was formed. A failure such as peeling was not observed at the joining interface.

Next, an amorphous silicon film having a thickness of 0.1 μm was formed as a joining layer on the upper surface of the quartz glass plate. After the film formation, the amorphous silicon film was subjected to planarization treatment by being polished. Here, the arithmetic average roughness of a 110 μm on the surface of the amorphous silicone film was measured with an atomic force microscope. As a result, the arithmetic average roughness was 0.2 nm.

In addition, in the same manner as in Example 1, a 3-inch silicon wafer (semiconductor substrate) having a thickness of 525 μm was prepared, and the direct joining of the silicon wafer and the quartz glass plate/InP composite substrate was performed. That is, the silicon wafer and the quartz glass plate were directly joined to each other via the amorphous silicon layer (joining portion). The direct joining was performed in the same manner as in Example 1.

Next, in the same manner as in Example 1, a photonic crystal (a two-dimensional photonic crystal slab, a line substrate) was formed by periodically forming holes in the silicon wafer, and then a coplanar electrode pattern was formed on the two-dimensional photonic crystal slab.

Thus, a waveguide device was produced.

The propagation loss of the resultant waveguide device was calculated and evaluated in the same manner as in Example 1. The results are shown in Table 1.

Example 9

A waveguide device was produced in the same manner as in Example 1 except that a line substrate was formed as an effective dielectric medium by forming periodic holes, which were arranged at a period of 160 μm and each had a hole radius of 72 μm, and a via hole in the silicon wafer.

The propagation loss of the resultant waveguide device was calculated and evaluated in the same manner as in Example 1. The results are shown in Table 1.

Example 10

A waveguide device was produced in the same manner as in Example 2 except that a line substrate was formed as an effective dielectric medium by forming periodic holes, which were arranged at a period of 160 μm and each had a hole radius of 72 μm, and a via hole in the silicon wafer.

The propagation loss of the resultant waveguide device was calculated and evaluated in the same manner as in Example 1. The results are shown in Table 1.

Example 11

A waveguide device was produced in the same manner as in Example 1 except that: the dimension of the depressed portion in its widthwise direction was changed; and the cavity was formed only directly below the line-defect waveguide. In other words, in the waveguide device of Example 11, the cavity was arranged so as not to overlap a plurality of holes.

The propagation loss of the resultant waveguide device was calculated and evaluated in the same manner as in Example 1. The results are shown in Table 1.

Example 12

A waveguide device was produced in the same manner as in Example 2 except that: the dimension of the depressed portion in its widthwise direction was changed; and the cavity was formed only directly below the line-defect waveguide and the resonator. In other words, in the waveguide device of Example 12, the cavity was arranged so as not to overlap a plurality of holes.

The propagation loss of the resultant waveguide device was calculated and evaluated in the same manner as in Example 1. The results are shown in Table 1.

Example 13

A waveguide device was produced in the same manner as in Example 1 except that the silicon wafer serving as the semiconductor substrate was changed to a SiC wafer.

The propagation loss of the resultant waveguide device was calculated and evaluated in the same manner as in Example 1. The results are shown in Table 1.

Example 14

A waveguide device was produced in the same manner as in Example 2 except that the silicon wafer serving as the semiconductor substrate was changed to a SiC wafer.

The propagation loss of the resultant waveguide device was calculated and evaluated in the same manner as in Example 1. The results are shown in Table 1.

Reference Example 1

A two-dimensional photonic crystal slab having formed therein a coplanar electrode pattern, which was obtained in the same manner as in Example 1 except that the line substrate was not joined to the support substrate, was adopted as a waveguide device.

The resultant waveguide device was held so that external environments on both the vertical sides of the line substrate each became air. A separately prepared resonance tunnel diode (active device) was connected to the input side of the photonic crystal device, and a receiving antenna and a RF signal receiver were connected to the output side of the line-defect waveguide of the device.

Next, the propagation loss of the waveguide device was calculated and evaluated in the same manner as in Example 1. The results are shown in Table 1.

Comparative Example 1

A waveguide device was produced in the same manner as in Example 1 except that no depressed portion was formed in the silicon wafer, and hence the waveguide device did not include a cavity serving as a low-dielectric constant portion.

The propagation loss of the resultant waveguide device was calculated and evaluated in the same manner as in Example 1. The results are shown in Table 1.

TABLE 1

| | No. | | Example 1 | Example 2 | Example 3 | Example 4 | Example 5 | Example 6 | Example 7 | Example 8 |
|---|---|---|---|---|---|---|---|---|---|---|
| Line substrate | Material | | Si | Si | Si | Si | Si | Si | Si | Si |
| | Mode | | Photonic crystal | Photonic crystal | Photonic crystal | Photonic crystal | Photonic crystal | Photonic crystal | Photonic crystal | Photonic crystal |
| | Dielectric constant ε | | 11.7 | 11.7 | 11.7 | 11.7 | 11.7 | 11.7 | 11.7 | 11.7 |
| | Thickness [μm] | | 230 | 230 | 230 | 230 | 230 | 230 | 230 | 230 |
| | √εD/10 | | 78.7 | 78.7 | 78.7 | 78.7 | 78.7 | 78.7 | 78.7 | 78.7 |
| Insulating layer | Material | | — | Quartz glass | — | — | — | — | Quartz glass | — |
| Support substrate | Material | | InP | InP | InP | InP | InP | Si | Si | InP |
| Low-dielectric constant portion | Configuration | | Cavity | | | Cavity | | Cavity | | Quartz glass |
| | Thickness [μm] | | 150 | | 100 | 200 | 50 | 150 | | 150 |
| Evaluation | Wavelength of electromagnetic wave having frequency of 300 GHz [μm] | | 1,000 | 1,000 | 1,000 | 1,000 | 1,000 | 1,000 | 1,000 | 1,000 |
| | Propagation loss [dB/cm] | 300 GHz | ⊚ | ⊚ | ○ | ⊚ | Δ | ⊚ | ⊚ | ○ |
| | | 30 GHz | ⊚ | ⊚ | ○ | ⊚ | Δ | ⊚ | ⊚ | ○ |
| | | 20 THz | ⊚ | ⊚ | ○ | ⊚ | Δ | ⊚ | ⊚ | ○ |

| | No. | Example 9 | Example 10 | Example 11 | Example 12 | Example 13 | Example 14 | Comparative Example 1 | Reference Example 1 |
|---|---|---|---|---|---|---|---|---|---|
| Line substrate | Material | Si | Si | Si | Si | SiC | | Si | Si |
| | Mode | Effective dielectric medium | Effective dielectric medium | Photonic crystal | Photonic crystal | Photonic crystal | Photonic crystal | Photonic crystal | Photonic crystal |
| | Dielectric constant ε | 11.7 | 11.7 | 11.7 | 11.7 | 9.8 | 9.8 | 11.7 | 11.7 |
| | Thickness [μm] | 230 | 230 | 230 | 230 | 230 | 230 | 230 | 230 |
| | √εD/10 | 78.7 | 78.7 | 78.7 | 78.7 | 72.0 | 72.0 | 78.7 | 78.7 |
| Insulating layer | Material | — | Quartz glass | — | Quartz glass | — | Quartz glass | — | — |
| Support substrate | Material | InP | InP | InP | InP | InP | InP | InP | — |

TABLE 1-continued

| | | | | | | | | | | |
|---|---|---|---|---|---|---|---|---|---|---|
| Low-dielectric constant portion | Configuration | | Cavity | | Cavity*Only directly below waveguide | | Cavity | | — | — |
| | Thickness [μm] | | 150 | | 150 | | 150 | | — | — |
| Evaluation | Wavelength of electromagnetic wave having frequency of 300 GHz [μm] | | 1,000 | 1,000 | 1,000 | 1,000 | 1,000 | 1,000 | 1,000 | 1,000 |
| | Propagation loss [dB/cm] | 300 GHz | ◎ | ◎ | Δ | Δ | ◎ | ◎ | x | ◎ |
| | | 30 GHz | ◎ | ◎ | Δ | Δ | ◎ | ◎ | x | ◎ |
| | | 20 THz | ◎ | ◎ | Δ | Δ | ◎ | ◎ | x | ◎ |

As is apparent from Table 1, even the waveguide device of Reference Example 1 that does not include any support substrate shows excellent low-propagation loss performance when the device is used while being held so that the external environments on both the vertical sides of the line substrate may each become air. However, as shown in Comparative Example 1, it is found that when the waveguide device of Reference Example 1 is mounted on the support substrate, the propagation loss of the waveguide device remarkably increases in the absence of any low-dielectric constant portion.

In contrast, the waveguide device of each of Examples of the present invention includes the low-dielectric constant portion. Accordingly, even when the line substrate is mounted on (supported by) the support substrate, the device shows a small propagation loss, and hence can secure excellent low-propagation loss performance.

The waveguide device according to the embodiments of the present invention can be used in a wide range of fields, such as waveguides, next-generation high-speed communication, sensors, laser processing, and solar power generation, and in particular, can be suitably used as a waveguide for waves ranging from a millimeter wave to a terahertz wave. Such waveguide device can be used for, for example, an antenna, a band-pass filter, a coupler, a delay line (phase shifter), or an isolator.

What is claimed is:

1. A waveguide device, comprising:

a line substrate having holes periodically formed in a semiconductor substrate;

a waveguide configured to propagate an electromagnetic wave while confining the electromagnetic wave therein with the holes;

a low-dielectric constant portion having a dielectric constant smaller than a dielectric constant of the line substrate, the low-dielectric constant portion overlapping the waveguide in a thickness direction of the line substrate; and a support substrate arranged below the line substrate, the support substrate being configured to support the line substrate, the waveguide device being configured to guide an electromagnetic wave having a frequency of 30 GHz or more and 20 THz or less.

2. The waveguide device according to claim 1, wherein a dimension of the low-dielectric constant portion in the thickness direction of the line substrate satisfies the following formula (1):

$$T \geq \sqrt{\varepsilon} \times D/10 \quad (1)$$

where T represents the dimension of the low-dielectric constant portion in the thickness direction of the line substrate, ε represents a dielectric constant of the line substrate at 300 GHz, and D represents a thickness of the line substrate.

3. The waveguide device according to claim 1, wherein a dimension of the low-dielectric constant portion in the thickness direction of the line substrate is 1/10 or more and 1/5 or less of a wavelength λ of the electromagnetic wave to be guided by the waveguide.

4. The waveguide device according to claim 1, further comprising an active device capable of at least one of transmission, reception, or amplification of the electromagnetic wave, the active device being supported by the support substrate.

5. The waveguide device according to claim 1, wherein the semiconductor substrate includes silicon, and wherein the support substrate includes at least one material selected from the group consisting of: indium phosphide; silicon; aluminum nitride; silicon carbide; and silicon nitride.

6. The waveguide device according to claim 1, wherein the low-dielectric constant portion is a cavity.

7. The waveguide device according to claim 6, wherein the line substrate is directly joined to the support substrate.

8. The waveguide device according to claim 7, wherein the support substrate has a depressed portion, and the cavity is defined by a lower surface of the line substrate and the depressed portion of the support substrate.

9. The waveguide device according to claim 6, further comprising an insulating layer positioned between the line substrate and the support substrate, wherein the cavity is defined by a lower surface of the line substrate, an upper surface of the support substrate, and the insulating layer.

10. The waveguide device according to claim 1, wherein the line substrate includes a photonic crystal or an effective dielectric medium.

11. The waveguide device according to claim 1, wherein the line substrate has formed therein a resonator and/or an antenna including a photonic crystal.

12. The waveguide device according to claim 1, wherein the low-dielectric constant portion overlaps all the holes in addition to the waveguide in the thickness direction of the line substrate.

* * * * *